United States Patent
Wang et al.

(10) Patent No.: US 8,597,562 B2
(45) Date of Patent: Dec. 3, 2013

(54) COMPOSITE PRODUCTS AND METHODS OF MAKING THE SAME

(75) Inventors: Chen-Shih Wang, Troy, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 978 days.

(21) Appl. No.: 11/393,319

(22) Filed: Mar. 30, 2006

(65) Prior Publication Data
US 2007/0230196 A1   Oct. 4, 2007

(51) Int. Cl.
 *D21J 3/00* (2006.01)
(52) U.S. Cl.
 USPC ........................................... 264/324
(58) Field of Classification Search
 USPC .................... 362/417; 264/324, 255, 40.1
 See application file for complete search history.

(56) References Cited

U.S. PATENT DOCUMENTS

| | | | |
|---|---|---|---|
| 2,736,362 A * | 2/1956 | Slayter et al. | 428/113 |
| 4,536,438 A * | 8/1985 | Bishop et al. | 442/247 |
| 4,647,329 A | 3/1987 | Oono et al. | |
| 4,668,460 A * | 5/1987 | Ongena | 264/255 |
| 4,716,072 A | 12/1987 | Kim | |
| 5,085,928 A * | 2/1992 | Krueger | 428/474.4 |
| 2005/0266203 A1 * | 12/2005 | La Forest et al. | 428/66.2 |

FOREIGN PATENT DOCUMENTS

| | | |
|---|---|---|
| WO | 2006008529 A1 | 1/2006 |
| WO | PCT/US07/63440 | 7/2007 |

OTHER PUBLICATIONS

U.S. Appl. No. 10/940,538, filed Sep. 14, 2004, Chen-Shih Wang et al.

* cited by examiner

*Primary Examiner* — Larry Thrower
(74) *Attorney, Agent, or Firm* — BrooksGroup

(57) ABSTRACT

A process comprising: placing a preform stack in a cavity of a molding tool; the preform stack comprising a fiber mat, and at least a first veil underlying the fiber mat, and a first resin impregnating at least the fiber mat, and wherein at least a portion of the first resin is cured; injecting a second resin into the cavity of the molding tool and over at least the fiber mat; applying heat and pressure to the preform stack and second resin to cure any uncured portion of the first resin and to cure the second resin to form a composite having a resin layer over the fiber mat as the cosmetic surface.

24 Claims, 4 Drawing Sheets

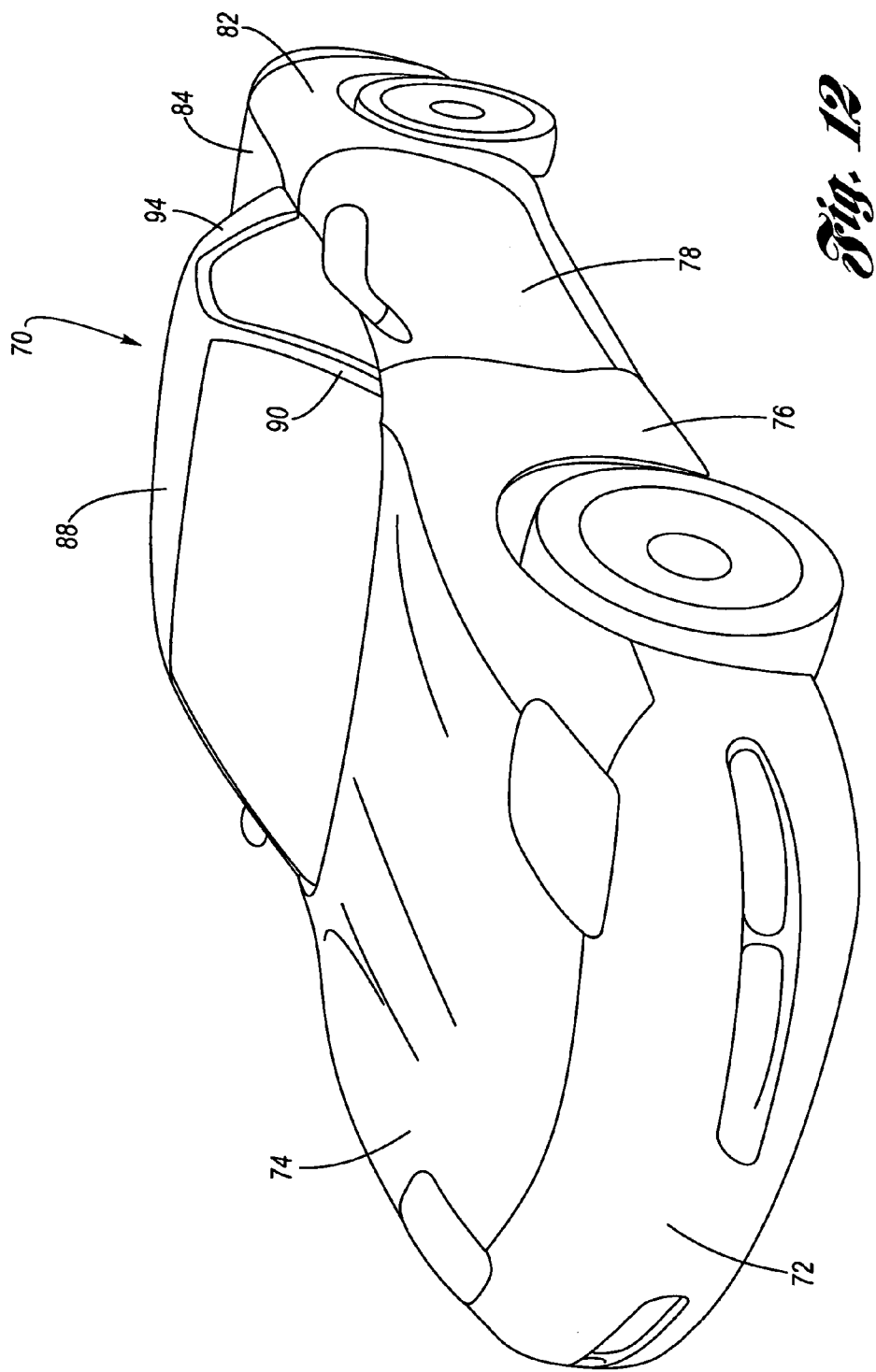

COMPOSITE PRODUCTS AND METHODS OF MAKING THE SAME

FIELD OF THE INVENTION

The present invention relates to composite products requiring highly cosmetic surface finish and methods of making the same.

BACKGROUND OF THE INVENTION

Composite products such as structural composite panels have been made using fiber reinforcement mats in liquid molding processes.

SUMMARY OF EXEMPLARY EMBODIMENTS OF THE INVENTION

One embodiment of the invention includes a process comprising: placing a preform stack in a cavity of a molding tool; the preform stack comprising a fiber mat, and at least a first veil underlying the fiber mat, and a first resin impregnating at least the fiber mat; and wherein at least a portion of the first resin is cured; injecting a second resin into the cavity of the mold and over at least the fiber mat; applying heat and pressure to the preform stack and second resin to cure any uncured portion of the first resin and to cure the second resin to form a composite having a resin layer over the fiber mat.

Another embodiment of the invention includes a process comprising: providing a reinforcement stack comprising a fiber mat, a first veil underlying the fiber mat, and a second veil overlying the fiber mat; impregnating the fiber reinforcement stack with a first resin; placing the resin impregnated fiber reinforcement stack in a preforming tool and applying heat and pressure to cure at least a portion of the first resin and to provide a preform; placing the preform in a cavity of a molding tool and injecting a second resin into the cavity and at least over the preform, and applying heat and pressure to cure any uncured portion of the first resin and to cure the second resin.

Another embodiment of the invention includes a process comprising: placing a preform stack in a cavity of a molding tool; the molding tool including a first shell and a second shell; the preform stack comprising a fiber mat, and a spacer underlying the fiber mat, and wherein the spacer is constructed and arranged to space the fiber mat a distance from the second shell, and a first resin impregnating at least the fiber mat, and wherein at least a portion of the first resin is cured; injecting a second resin into the cavity of the mold and over at least the fiber mat; applying heat and pressure to the preform stack and second resin to cure any uncured portion of the first resin and to cure the second resin to form a composite having a resin layer over the fiber mat.

Another embodiment of the invention includes a product comprising: a molded composite structure comprising a fiber mat portion, a first veil underlying the fiber mat portion, and a resin layer over the fiber mat portion.

Other embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 illustrates a process of impregnating a fiber reinforcement stack with a curable first resin according to one embodiment of the invention.

FIG. 5 illustrates a preform stack according to one embodiment of the invention.

FIG. 12 illustrates a product including molded composite panels according to one embodiment of the invention.

DETAILED DESCRIPTION OF EXEMPLARY EMBODIMENTS

The following description of the preferred embodiment(s) is merely exemplary in nature and is in no way intended to limit the invention, its application, or uses.

Figure 1:
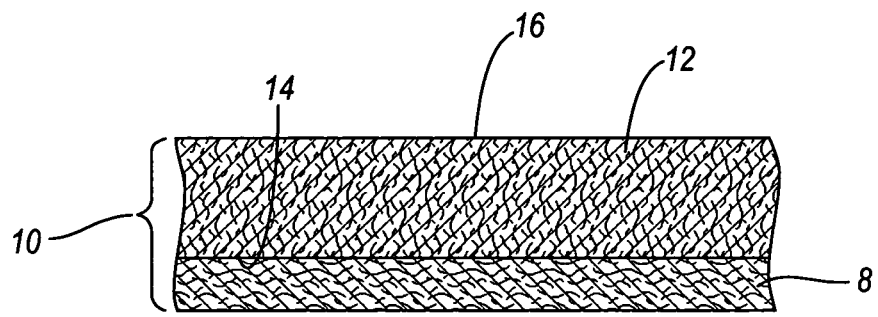
FIG. 1 illustrates a fiber reinforcement stack according to one embodiment of the invention.

FIG. 1 illustrates a fiber reinforcement stack 10 which includes at least a fiber mat 12. The fiber mat 12 includes a first face 14 and an opposite second face 16. The fiber mat 12 includes fibers which may be woven or randomly distributed and may also include a binder to hold the fibers together. In alternative embodiments, the fibers of the fiber mat 12 may include, but are not limited to, glass fibers, carbon fibers, polyester fibers, polyolefin fibers, polyamide fibers or natural fibers. The thickness of the fiber mat 12 may be varied as desired, but in one embodiment, the thickness ranges from about 0.5 mm to about 5 mm. In one embodiment of the invention, the fiber reinforcement stack 10 also includes a spacer 8 underlying the first face 14 of the fiber mat 12. The spacer 8 may include any material compatible with liquid molding processes and capable of spacing the fiber mat 12 a distance from the shaping surface 38 of a portion 36 of a preforming tool 32 or a distance from the shaping surface 50 of a portion 48 of a molding tool 42 as will be described hereafter. In alternative embodiments of the invention, the spacer 8 may include, but is not limited to, a layer including synthetic or natural fibers, polymeric, ceramic or metallic foams or perforated or solid metal sheets. In one embodiment of the invention, the spacer 8 has a thickness ranging from about 0.1 mm to about 3 mm.

Figure 2:
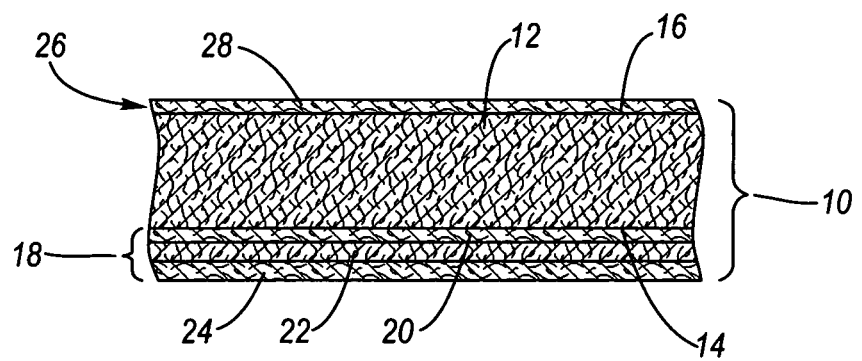
FIG. 2 illustrates a fiber reinforcement stack according to another embodiment of the invention.

Referring now to FIG. 2, in one embodiment of the invention, the fiber reinforcement stack 10 includes a first veil 18 underlying the first face 14 of the fiber mat 12. In one embodiment of the invention, the first veil 18 includes at least a first layer 20 of randomly distributed fibers. Optionally, to achieve the desired thickness, the first veil 18 may also include a second layer 22 including randomly distributed fibers underlying the first layer 20. A third layer 24 of randomly distributed fibers may optionally be provided underlying the second layer 22. In alternative embodiments of the invention, the fibers in the first, second, or third layers 20, 22, 24 may include, but are not limited to, glass, carbon, polyester or cotton fibers. In another embodiment of the invention, a second veil 26 may be provided over the second face 16 of the fiber mat 12 to achieve the desired cosmetic surface finish. The second veil 26 may include at least a first layer 28 including randomly distributed fibers which may, for example, be made from glass, carbon, polyester or cotton. In alternative embodiments of the invention, each of the layers 20, 22, 24 and 28 may have a thickness ranging from about 0.05 mm to 0.5 mm.

Referring now to FIG. 3, in one embodiment of the invention, the fiber reinforcement stack 10 is impregnated with a curable first resin 30. In alternative embodiments of the invention, the curable first resin 30 may include at least one of epoxy, vinylester, polyester or polyurethane. The first resin 30 may also contain filler particles including, for example, at least one of calcium carbonate, silica, milled glass or glass spheres.

Figure 4:
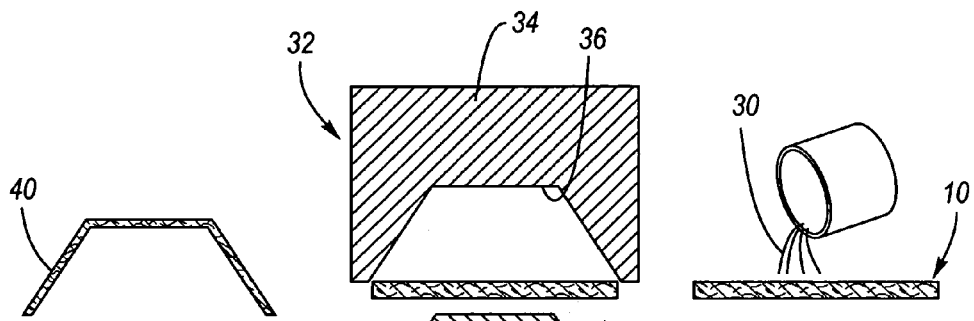
FIG. 4 illustrates a process including placing the resin impregnated fiber reinforcement stack in a preforming tool and curing at least a portion of the first resin according to one embodiment of the invention.

Referring now to FIG. 4, in one embodiment of the invention, the resin impregnated fiber reinforcement stack 10 is placed in a cavity 100 of a preforming tool 32, which may be of a clamshell type, including an upper shell 34 including a preform shaping surface 36, and a lower shell 37 having a preform shaping surface 38. The upper shell 34 and lower shell 37 of the preforming tool 32 are closed, and heat and pressure applied to the resin impregnated fiber reinforcement stack 10 to at least partially cure the first resin. In one embodiment of the invention, pressure is applied by the preforming tool 32 on the resin impregnated fiber reinforcement stack 10 in a range from about 0.35 MPa to about 3.5 MPa, and heat is applied in a range of about 20° C. to about 150° C. In one embodiment of the invention, about 10% to about 80% of the first resin is cured in the preforming tool to provide a preform 40 as shown in FIG. 5.

Figure 6:
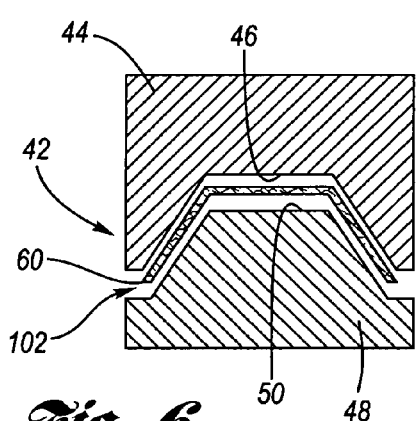
FIG. 6 illustrates a process including placing a preform stack in a molding tool according to one embodiment of the invention.

Referring now to FIG. 6, in one embodiment of the invention, a preform stack 60 is placed in a cavity 102 of a molding tool 42. The molding tool 42 includes an upper shell 44 having a composite panel shaping surface 46, and a lower shell 48 including a composite shaping surface 50. In one embodiment of the invention, at least one of the upper shell 44 or lower shell 48 includes resin injection pathways and ports (not shown). In one embodiment of the invention, only the upper shell 44 includes resin injection paths and ports.

Figure 7:
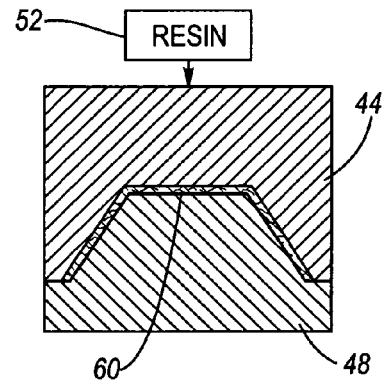
FIG. 7 illustrates a process including injecting a curable second resin into a molding tool to overmold a preform stack according to one embodiment of the invention.

Referring now to FIG. 7, in one embodiment of the invention, a curable second resin 52 is injected into the molding tool 42 to form the cosmetic surface over the preform stack 60. In one embodiment of the invention, the first resin 30 and the second resin 52 are the same. In one embodiment of the invention, the second resin 52 may include epoxy, vinylester, polyester, or polyurethane. The second resin 52 may also contain filler particles including at least one of calcium carbonate, silica, milled glass or glass spheres. The first resin 30 and the second resin 52 may also be different in polymers and fillers in order to achieve desired curing speed and physical and mechanical properties of the composite panels.

Figure 8:
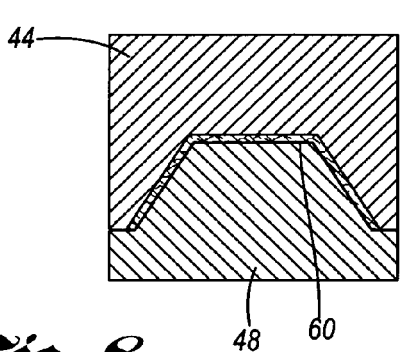
FIG. 8 illustrates a process including curing the first and second resins according to one embodiment of the invention.
Figure 9:
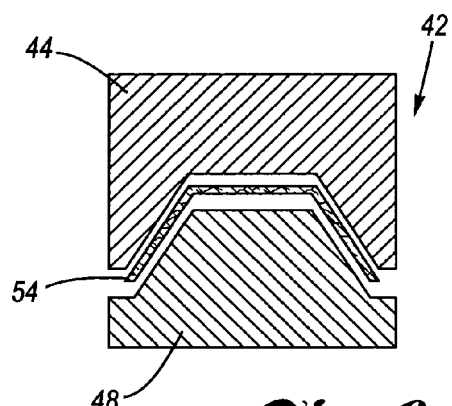
FIG. 9 illustrates a process including demolding a molded composite panel from the molding tool according to one embodiment of the invention.

Referring now to FIG. 8, pressure and heat are applied by the molding tool 42 to cure the remaining uncured portion of the first resin 30 and to cure the second resin 52. In one embodiment of the invention, pressure is applied by the molding tool 42 on the perform stack 60 and second resin 52 in a range from about 0.7 MPa to about 7 MPa, and heat is applied in a range of about 50° C. to about 150° C., to cure any uncured portion of the first resin 30 and to cure the second resin 52. Thereafter, the upper shell 44 and the lower shell 48 are displaced from each other to demold a molded composite panel 54.

Figure 10:
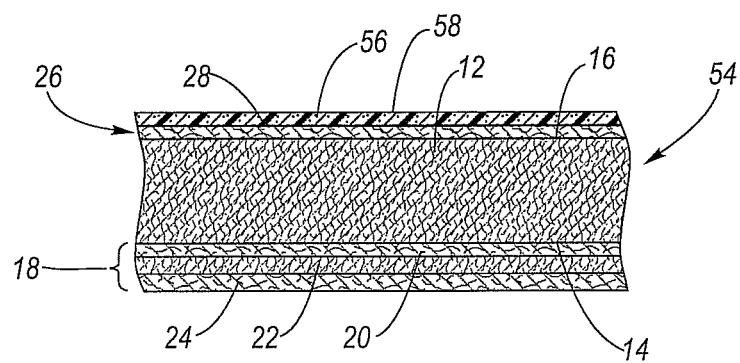
FIG. 10 illustrates a product according to one embodiment of the invention.

Referring now to FIG. 10, one embodiment of the invention includes a molded composite panel 54 including a fiber mat portion 12 and an underlying first veil 18. As previously described, the first veil 18 may include at least a first layer 20 including randomly dispersed fibers, and wherein the first layer 20 underlies the first face 14 of the fiber mat portion 12. Optionally, a second layer 22 including randomly dispersed fibers may underlie the first layer 20. Optionally, a third layer 24 including randomly distributed fibers may underlie the second layer 22. A second veil 26 including at least a first layer 28 of randomly distributed fibers may overlie the second face 16 of the fiber mat portion 12. The layers 20, 22, 24, fiber mat 20, and layer 28 are bonded together by cured resin. In one embodiment of the invention, the molded composite panel 54 also includes a resin layer 56 overlying the second face 16 of the fiber mat portion 12. In one embodiment of the invention, the resin layer 56 includes a cosmetic surface 58. In other embodiments of the invention no fibers extend through the resin layer 56 and/or no fiber is exposed at the cosmetic surface 58.

Figure 11:
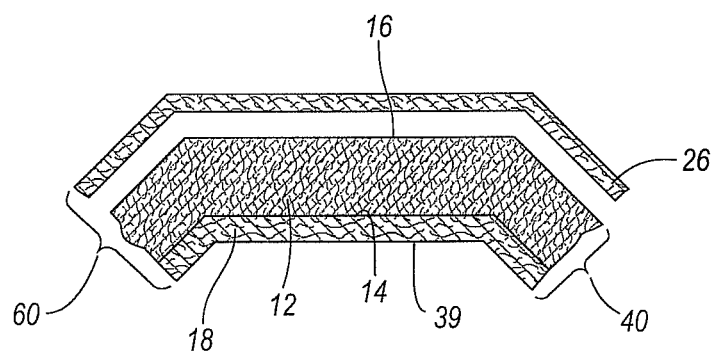
FIG. 11 illustrates a preform stack according to one embodiment of the invention.

Referring now to FIG. 11, in one embodiment of the invention, the preform stack 60 placed in the molding tool 42, as previously described with respect to FIG. 6, may include a variety of embodiments. The preform stack 60 may include a preform 40 which includes a fiber mat portion 12 and a first veil portion 18. The first veil portion 18, in one embodiment of the invention, is bonded to the fiber mat portion 12. Optionally, the preform stack 60 may include a second veil 26 overlying the second surface 16 of the fiber mat portion 12. The preform 40 and the second veil 26 may be placed in the molding tool 42 as one unit, or they may be placed in the molding tool 42 separately.

According to one embodiment of the invention, an unbalanced preform was constructed using one ply of plain weave, large woven glass fabric available under the trade name ROV-CLOTH 245, available from Fiberglass Industries. Three plies of thin tissue-like glass veils available from Owens Corning under the trade name F2/30 was placed under the glass fabric. One ply of the same veil material was placed over the glass fabric to provide a fiber reinforcement stack. The stack was cut to 200 mm×200 mm size, placed in a preforming plaque mold and impregnated with degassed epoxy resin prepared from a formula including: 100 parts by weight DER 383 available from Dow Chemical Company, epoxy resin; 80 parts of methyltertahydrophthali anhydride 600 (available from Lonza Group, as a curing agent; two parts of 1,2 dimethylimidazole available from BASF as a catalyst; and 87 parts by weight of CAMEL-FIL, available from Imerys as a calcium carbonate filler. The resin impregnated fiber reinforcement stack was compressed in a preform mold at 100° C. and at 1.4 MPa pressure for about 20 minutes. The resulting preform had a nominal thickness of 1.0 mm and approximately 75% of the first resin was cured in the preform. Thereafter, the partially cured preform was transferred to an overmolding plaque tool for final cosmetic surface molding and complete curing. An additional ply of the veil material was added to the cosmetic side of the preform before degassed where a second resin prepared from the above described formula was introduced onto the additional ply of veil material. The final molding was carried out at about 140° C. and 1.4 MPa pressure for 15 minutes. The resultant flat composite panel was 1.2 mm in thickness.

Molded composite panels 54 as described above may be utilized in a variety of products including, but not limited to, boats, vehicles, appliances, and furniture. Referring now to FIG. 12, in one embodiment of the invention, molded composite panels 54 as described above may be utilized to form body panels of a vehicle 70 including, but not limited to, the front fascia 72, hood 74, front fender 76, front door 78, rear doors (if present), rear fenders 82, trunk lid 84, roof 88 and pillars 90 and 94. The molded composite panels may be attached to the vehicle body (not shown) which is attached to a vehicle frame (not shown) in a manner known to those skilled in the art.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process comprising:
   providing a preform stack and a molding tool, opening the molding tool and placing the preform stack in a cavity of the molding tool; the preform stack comprising a fiber mat, at least a first veil underlying the fiber mat, and a first resin impregnating at least the fiber mat, wherein at least a portion of the first resin is cured, and wherein the at least a first veil comprises a first layer and a second layer underlying the first layer, both of the first and second layers comprising randomly distributed fibers;
   injecting a second resin into the cavity of the mold and over at least the fiber mat;
   applying heat and pressure to the preform stack and second resin to cure any uncured portion of the first resin and to cure the second resin to form a composite having a resin layer over the fiber mat.

2. A process as set forth in claim 1 wherein the preform stack further comprises a second veil over the fiber mat.

3. A process as set forth in claim 1 wherein the first veil further comprises a third layer comprising randomly distributed fibers, the third layer of the first veil underlying the second layer of the first veil.

4. A process as set forth in claim 2 wherein the second veil comprises at least a first layer comprising randomly distributed fibers.

5. A process as set forth in claim 1 wherein the first resin comprises at least one of epoxy, vinylester, polyester or polyurethane.

6. A process as set forth in claim 1 wherein the second resin comprises at least one of epoxy, vinylester, polyester or polyurethane.

7. A process as set forth in claim 1 wherein the fiber mat comprises woven fibers.

8. A process as set forth in claim 1 wherein the fiber mat comprises randomly distributed fibers.

9. A process as set forth in claim 1 wherein the fiber mat comprises fibers comprising at least one of glass, carbon, polyester, polyolefin, polyamide or natural fibers.

10. A process as set forth in claim 1 further comprising forming the preform stack comprising providing a fiber reinforcement stack comprising at least a fiber mat, and impregnating the fiber mat with the first resin, and placing the fiber reinforcement stack in a preforming tool and curing at least a portion of the first resin.

11. A process as set forth in claim 10 wherein about 10% to about 80% of the first resin is cured in the preforming tool.

12. A process as set forth in claim 10 wherein the fiber reinforcement stack comprises the first veil underlying the fiber mat.

13. A process as set forth in claim 10 wherein the fiber reinforcement stack comprises the first veil comprising at least the first layer comprising randomly distributed fibers.

14. A process as set forth in claim 13 wherein the first veil further comprises a second layer comprising randomly distributed fibers, the second layer of the first veil underlying the first layer of first veil.

15. A process as set forth in claim 14 wherein the first veil further comprises a third layer of randomly distributed fibers, the third layer of the first veil underlying the second layer of the first veil.

16. A process as set forth in claim 12 further comprising a second veil overlying the fiber mat.

17. A process as set forth in claim 16 wherein the second veil comprises at least a first layer comprising randomly distributed fibers.

18. A process comprising:
    providing a first reinforcement stack comprising a fiber mat, a first veil underlying the fiber mat, and a second veil overlying the fiber mat;
    impregnating the fiber reinforcement stack with a first resin;
    placing the resin impregnated fiber reinforcement stack in a preforming tool and applying heat and pressure to cure at least a portion of the first resin and to provide a preform;
    removing the preform from the preforming tool and placing the preform in a cavity of a molding tool different than the preforming tool and injecting a second resin into the cavity and at least over the preform, and applying heat and pressure to cure any uncured portion of the first resin and to cure the second resin so that a molded composite panel having a cosmetic surface is produced wherein no fiber is exposed at the cosmetic surface.

19. A process as set forth in claim 1 wherein the placing, injecting and applying are conducted so that a molded composite panel having a cosmetic surface is produced wherein no fiber is exposed at the cosmetic surface.

20. A process as set forth in claim 19 wherein the panel comprises a vehicle body panel.

21. A process comprising:
    providing a preform stack and a molding tool, opening the molding tool and placing the preform stack in a cavity of the molding tool; the preform stack comprising a fiber mat, at least a first veil underlying the fiber mat, and a first resin impregnating at least the fiber mat, wherein at least a portion of the first resin is cured, and wherein the at least a first veil comprises a first layer and a second layer underlying the first layer, both of the first and second layers comprising randomly distributed fibers wherein the first veil is thinner than the fiber mat;
    injecting a second resin into the cavity of the mold and over at least the fiber mat;
    applying heat and pressure to the preform stack and second resin to cure any uncured portion of the first resin and to cure the second resin to form a composite having a resin layer over the fiber mat.

22. A process comprising:
- providing a first reinforcement stack comprising a fiber mat, a first veil underlying the fiber mat, and a second veil overlying the fiber mat;
- impregnating the fiber reinforcement stack with a first resin;
- placing the resin impregnated fiber reinforcement stack in a preforming tool and applying heat and pressure to cure at least a portion of the first resin and to provide a preform;
- removing the preform from the preforming tool and placing the preform in a cavity of a molding tool different than the preforming tool and injecting a second resin into the cavity and at least over the preform, and applying heat and pressure to cure any uncured portion of the first resin and to cure the second resin so that a molded composite panel having a cosmetic surface is produced wherein no fiber is exposed at the cosmetic surface wherein the second veil comprises layers having a thickness ranging from about 0.05 mm to 0.5 mm.

23. A process as set forth in claim 1 wherein the first veil further comprises glass, carbon, polyester, or cotton fibers.

24. A process as set forth in claim 18 wherein the second veil further comprises glass, carbon, polyester, or cotton fibers.

* * * * *